United States Patent
Kim et al.

(10) Patent No.: US 9,694,851 B2
(45) Date of Patent: Jul. 4, 2017

(54) APPARATUS AND METHOD OF GENERATING TRAVEL ROUTE OF VEHICLE

(71) Applicant: HYUNDAI MOBIS CO., LTD., Seoul (KR)

(72) Inventors: Jeong Ku Kim, Yongin (KR); Sung Hoon Park, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 301 days.

(21) Appl. No.: 14/327,273

(22) Filed: Jul. 9, 2014

(65) Prior Publication Data
US 2015/0120187 A1    Apr. 30, 2015

(30) Foreign Application Priority Data
Oct. 31, 2013    (KR) .................. 10-2013-0130974

(51) Int. Cl.
*G01C 21/34*    (2006.01)
*B62D 15/02*    (2006.01)

(52) U.S. Cl.
CPC .......... *B62D 15/025* (2013.01); *G01C 21/34* (2013.01)

(58) Field of Classification Search
CPC .... G05D 1/0055; G05D 1/0088; G08G 1/165; G08G 1/166; G01S 13/931; G01S 17/93; G01S 17/936; B60W 30/09; B60W 2550/10; B60W 2720/24
See application file for complete search history.

(56) References Cited

U.S. PATENT DOCUMENTS

| | | | |
|---|---|---|---|
| 2007/0156286 A1* | 7/2007 | Yamauchi ............ | G05D 1/0038 700/245 |
| 2012/0109504 A1* | 5/2012 | Yopp .................... | G08G 1/0965 701/117 |
| 2015/0232073 A1* | 8/2015 | Fujishiro ................... | B60T 7/22 701/70 |

FOREIGN PATENT DOCUMENTS

KR    10-2011-0041841 A    4/2011

* cited by examiner

*Primary Examiner* — Thomas G Black
*Assistant Examiner* — Ce Li

(57) ABSTRACT

Provided are an apparatus and a method of generating a travel route, which generate a travel route by using fixed objects positioned at a front side. The apparatus for generating a travel route includes: a space information obtaining unit configured to obtain information on a space, in which a driver's vehicle is allowed to travel, by using fixed objects positioned at both sides of the driver's vehicle; a travelling direction estimating unit configured to estimate a travelling direction of the driver's vehicle based on travelling information about the driver's vehicle and information on distances to the fixed objects; and a travel route generating unit configured to generate a travel route of the driver's vehicle based on the space information and the travelling direction of the driver's vehicle.

9 Claims, 6 Drawing Sheets

[FIG. 1]
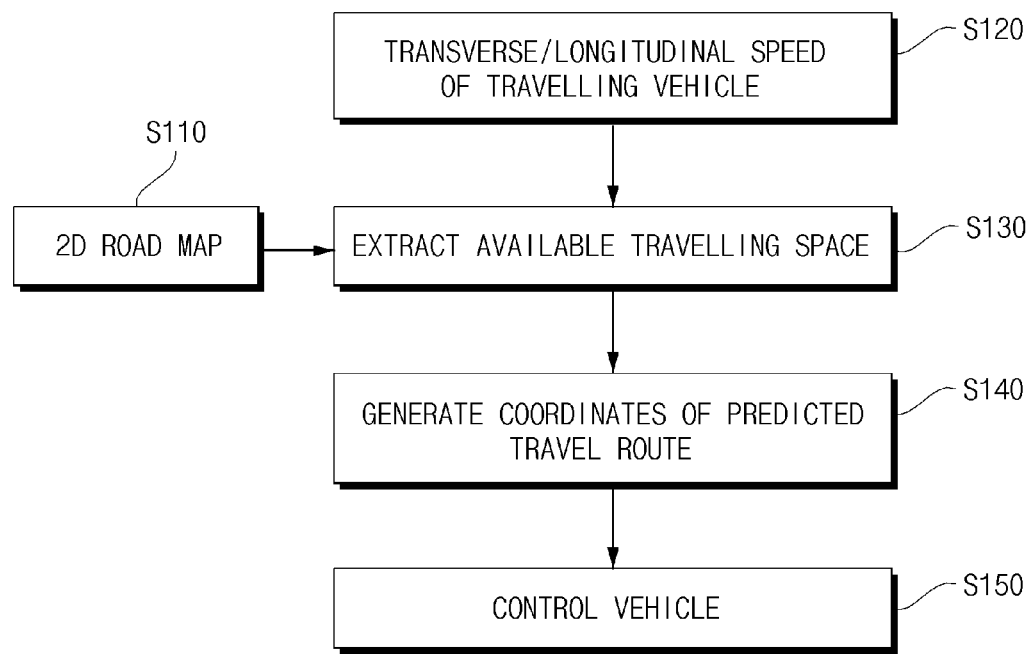

[FIG. 2A]
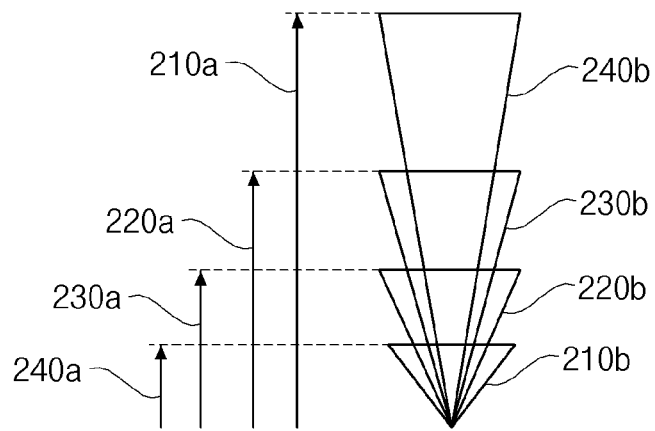
[FIG. 2B]
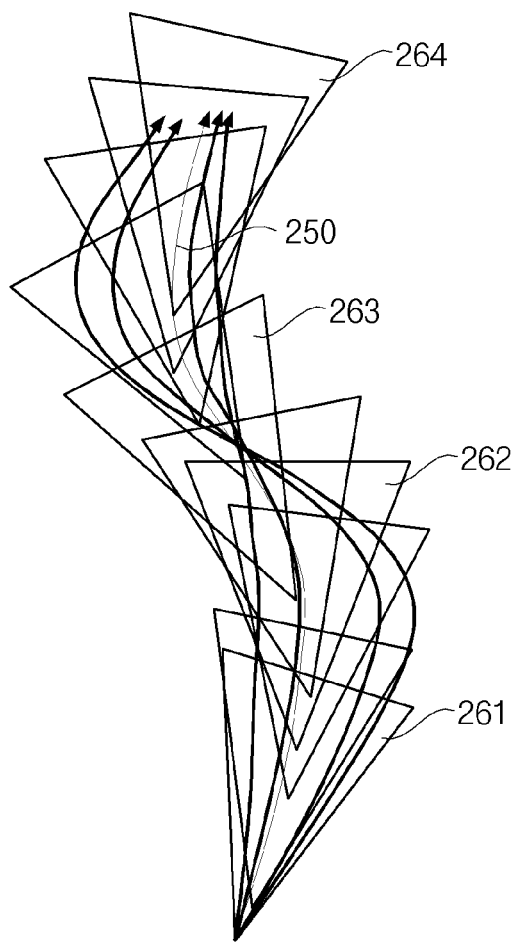

[FIG. 3]
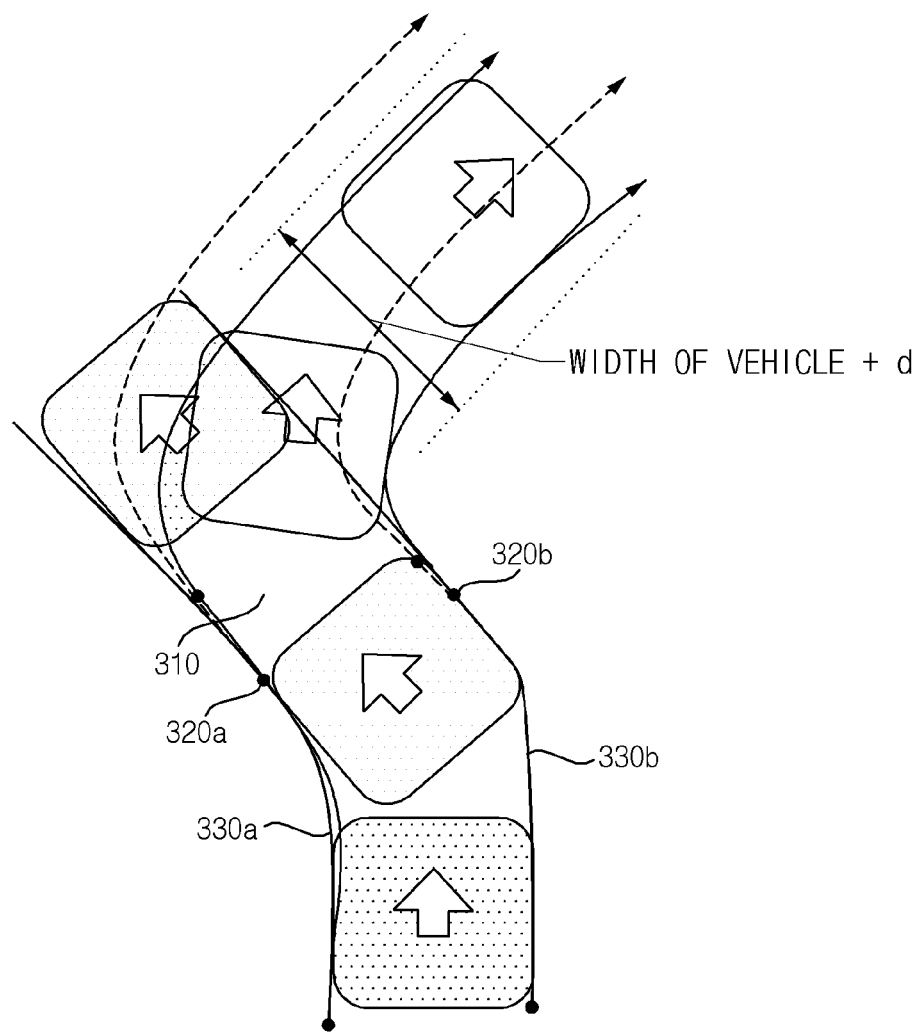

[FIG. 4]
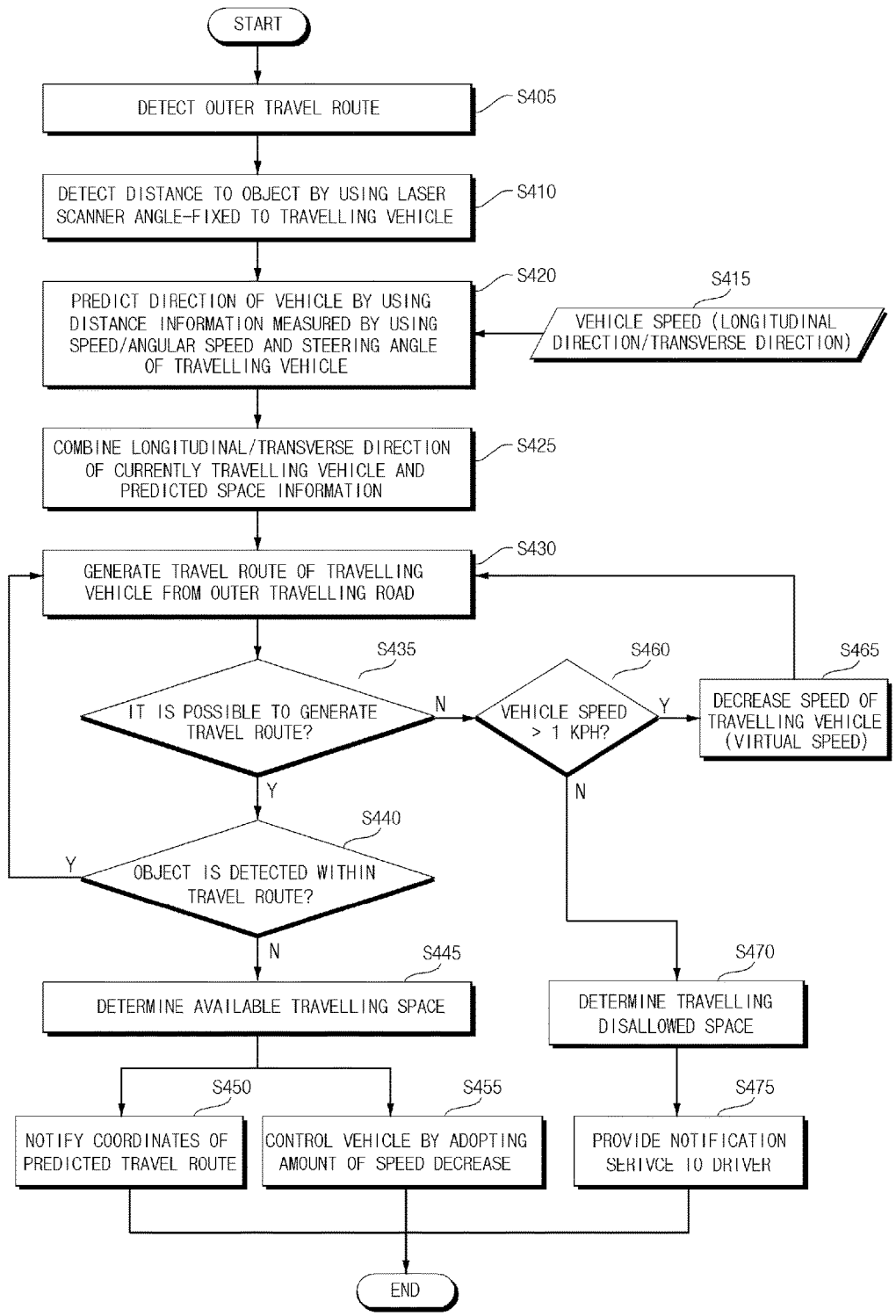

[FIG. 5]
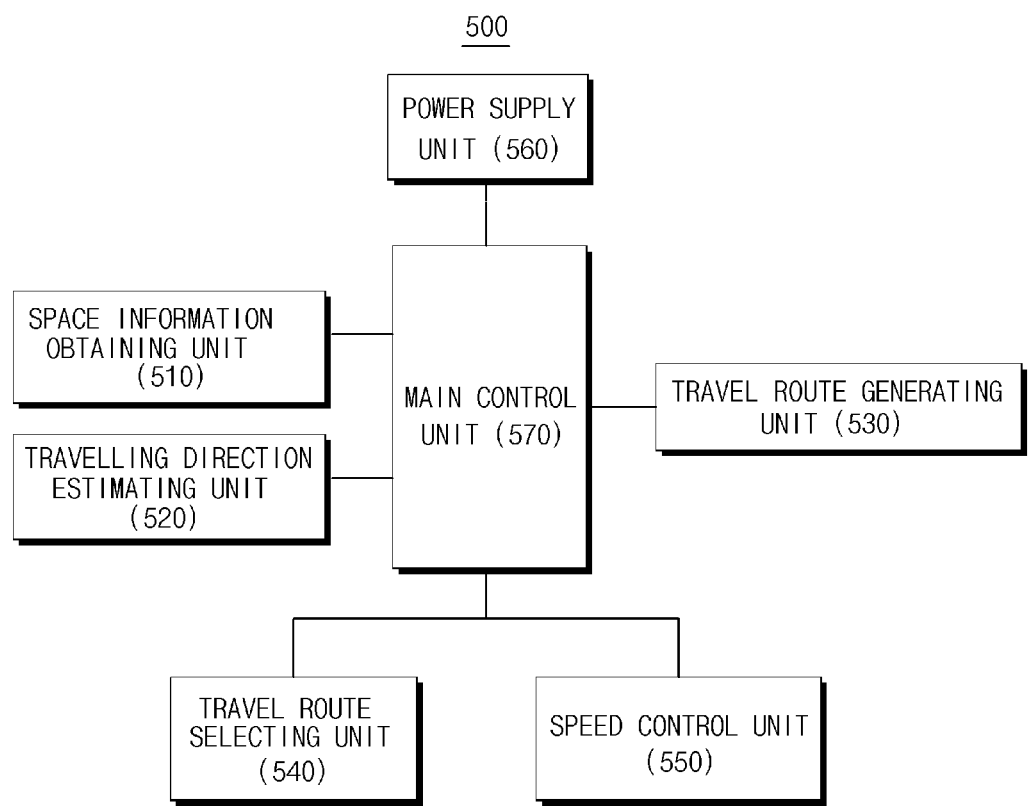

[FIG. 6]
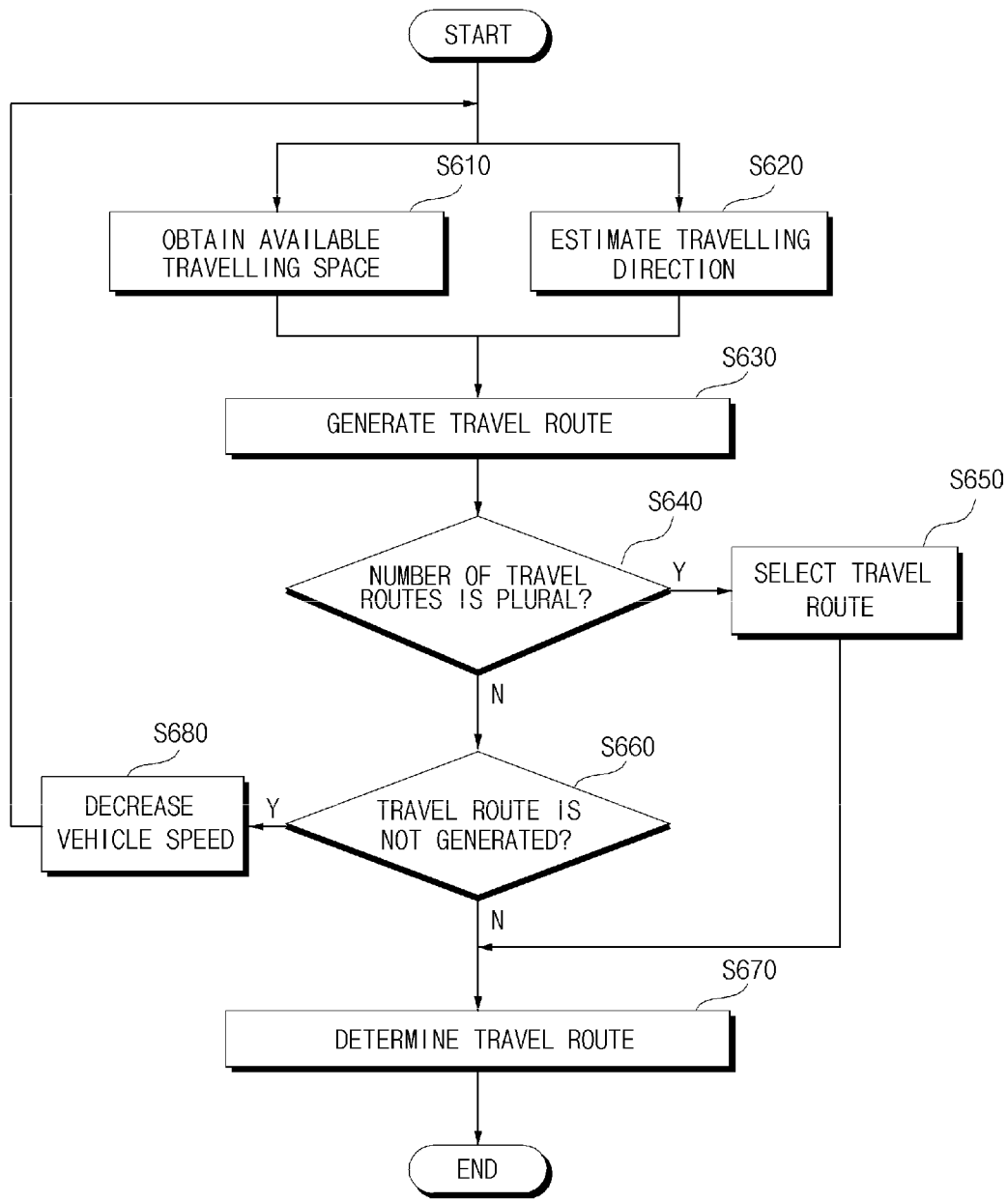

APPARATUS AND METHOD OF GENERATING TRAVEL ROUTE OF VEHICLE

CROSS-REFERENCE TO RELATED APPLICATIONS

This application claims priority to and the benefit of Korean Patent Application No. 10-2013-0130974 filed in the Korean Intellectual Property Office on Oct. 31, 2013, the entire contents of which are incorporated herein by reference.

TECHNICAL FIELD

The present invention relates to an apparatus and a method of generating a travel route of a vehicle. More particularly, the present invention relates to an apparatus and a method of generating a travel route of a vehicle without using a GPS.

BACKGROUND ART

An unmanned vehicle in the related art pre-sets a travel route, and then controls travelling of the vehicle based on a current position of the vehicle obtained from a GPS. The travelling control method in the related art has the problems below.

First, a vehicle may be driven only with a designated travel route by using a position determination sensor inside the vehicle based on a GPS and a designated map. Accordingly, when there is an obstacle or road information is changed, the vehicle cannot travel to a space in which the vehicle is avoidable. That is, in a situation where an object or a map within the travel route is changed, the vehicle cannot avoidably travel by using an external sensor of the vehicle.

Second, a dynamic movement of the vehicle cannot be considered in a situation where a vehicle speed is variably changed in a designated travel route, so that the vehicle deviates from the travel route.

Korean Patent Application Laid-Open No. 2011-0041841 describes a system for searching for a travel route of an electric vehicle. However, the system generates a travel route by using a GPS, so that it is impossible to solve the aforementioned problems.

SUMMARY OF THE INVENTION

The present invention has been made in an effort to provide an apparatus and a method of generating a travel route, which generate a travel route by using fixed objects positioned in a front direction.

However, an object of the present invention is not limited to the aforementioned matters, and those skilled in the art will clearly understand non-mentioned other objects through the following description.

An exemplary embodiment of the present invention provides an apparatus for generating a travel route, including: a space information obtaining unit configured to obtain information on a space, in which a driver's vehicle is allowed to travel, by using fixed objects positioned at both sides of the driver's vehicle; a travelling direction estimating unit configured to estimate a travelling direction of the driver's vehicle based on travelling information about the driver's vehicle and information on distances to the fixed objects; and a travel route generating unit configured to generate a travel route of the driver's vehicle based on the space information and the travelling direction of the driver's vehicle.

The space information obtaining unit may extract the fixed objects from an image obtained by photographing a front side of the driver's vehicle, or an image obtained by collecting laser signals emitted to the front side of the driver's vehicle and then reflected and returned.

The travelling direction estimating unit may use a speed of the driver's vehicle and information on a rotation of the driver's vehicle as the travelling information.

The travelling direction estimating unit may use an angular speed or a steering angle as the information on the rotation.

The travel route generating unit may generate the travel route by including a coordinate value of a position in which the driver's vehicle is to travel, and a travelling available speed of the driver's vehicle.

The apparatus for generating the travel route may further include a travel route selecting unit configured to select one travel route based on whether a moving object is positioned in travel routes, and a radius of the rotation of the driver's vehicle when two or more travel routes are generated.

The apparatus for generating the travel route may further include a speed control unit configured to decrease a speed of the driver's vehicle when the travel route is not generated for a predetermined time, and sequentially drive the space information obtaining unit, the travelling direction estimating unit, and the travel route generating unit again.

The apparatus for generating the travel route may be driven when the travel route is not generated by using a GPS.

When only fixed objects positioned at one side of the driver's vehicle are extracted, the space information obtaining unit may obtain the space information based on the fixed objects extracted at one side of the driver's vehicle, and a width obtained by adding a predetermined value to a width of the driver's vehicle, and when the fixed objects are not extracted at both sides of the driver's vehicle, the space information obtaining unit may recognize both lines and obtain the space information.

Another exemplary embodiment of the present invention provides a method of generating a travel route, including: obtaining information on a space, in which a driver's vehicle is allowed to travel, by using fixed objects positioned at both sides of the driver's vehicle; estimating a travelling direction of the driver's vehicle based on travelling information about the driver's vehicle and information on distances to the fixed objects; and generating a travel route of the driver's vehicle based on the space information and the travelling direction of the driver's vehicle.

The method may further include selecting one travel route based on whether a moving object is positioned in travel routes, and a radius of the rotation of the driver's vehicle when two or more travel routes are generated after the generating of the travel route.

The method may further include controlling a speed for decreasing a speed of the driver's vehicle when the travel route is not generated for a predetermined time after the generating of the travel route, and sequentially driving the obtaining of the space information, the estimating of the travelling direction, and the generating of the travel route again after the controlling of the speed.

The present invention may achieve the effects below by generating a travel route by using fixed objects positioned at a front side.

First, the present invention extracts an available travelling space for a vehicle when a travel map is generated by organizing an external object so that an unmanned vehicle may travel based on the external object in a situation where a GPS is not normally operated, thereby allowing travelling to be secured by the unmanned vehicle.

Second, the present invention generates a travel route even without using the GPS, thereby improving marketability of a vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a flowchart schematically illustrating an operation sequence of a system according to an exemplary embodiment of the present invention.

FIGS. 2A and 2B are reference diagrams illustrating a method of extracting an available travelling space in the system according to the exemplary embodiment of the present invention.

FIG. 3 is a reference diagram for describing a method of generating a 2D road map based on outer road information in the system according to the exemplary embodiment of the present invention.

FIG. 4 is a flowchart illustrating the operation sequence of the system according to the exemplary embodiment of the present invention in detail.

FIG. 5 is a block diagram schematically illustrating a travel route generating apparatus according to an exemplary embodiment of the present invention.

FIG. 6 is a flowchart schematically illustrating a method of generating a travel route according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment according to the present invention will be described in detail with reference to the accompanying drawings. First, in denoting reference numerals to constitutional elements of respective drawings, the same elements will be designated by the same reference numerals although they are shown in different drawings. In the following description of the present invention, a detailed description of known configurations or functions incorporated herein will be omitted when it is determined that the detailed description may make the subject matter of the present invention unclear. An exemplary embodiment of the present invention will be described below, but the technical spirit of the present invention is not limited thereto and may be modified and variously implemented by those skilled in the art.

FIG. 1 is a flowchart schematically illustrating an operation sequence of a system according to an exemplary embodiment of the present invention.

A system according to an exemplary embodiment of the present invention is a system for extracting a travelling space in real time by using road information by an autonomous vehicle.

The present invention is suggested under the background below.

First, there is a need for an ability for recognizing an external object by a distance measurement sensor in an unmanned driven vehicle.

Second, it is for the purpose of allowing traveling of an unmanned vehicle to be secured by reflecting a situation of a traveled road measured in real time.

Third, there is a need for a logic for checking a traveling available region to enable an unmanned vehicle to travel when the unmanned vehicle travels a designated travel route and a non-designated route.

The objects to be achieved by the present invention will be described below.

First, the present invention distinguishes and suggests an available travelling space of a travelling vehicle based on road information and an obstacle measured by an external observation sensor.

Second, the present invention notifies a control device of a vehicle of a speed of the vehicle so that the vehicle passes through an available travelling space by predicting a dynamic movement of the travelling vehicle based on road information and an obstacle measured by an external observation sensor.

FIG. 1 illustrates a basic configuration of a system according to an exemplary embodiment of the present invention.

The present invention extracts an available travelling space from outer road information before travelling (S130) by using 2D data generated based on the outer road information generated by an external observation sensor, such as a laser or an image (S110) considering a longitudinal/transverse speed of a travelling vehicle (S120), and matches a dynamic movement route according to a speed of the travelling vehicle and information on a curved line of the outer road information to extract the available travelling space. When the available travelling space is extracted by using the aforementioned method, the present invention predicts an optimum travel route within the available travelling space, and generates position coordinates of the route which the vehicle is to travel. Then, the present invention controls the travelling of the vehicle by using the position coordinates (S150).

FIGS. 2A and 2B are reference diagrams illustrating a method of extracting an available travelling space in the system according to the exemplary embodiment of the present invention.

The present invention extracts the available travelling space considering a travelling speed. Particularly, the present invention extracts the available travelling space simultaneously considering a longitudinal speed and a transverse speed of the travelling vehicle.

First, the present invention extracts the available travelling space considering a longitudinal speed of the travelling vehicle as illustrated in FIG. 2A. When a vehicle speed is increased, a movement capability of the vehicle is correspondingly increased. The present invention extracts the available travelling space considering this point. For example, when the longitudinal speed of the vehicle is a speed denoted by reference numeral 210*a*, the available travelling space is calculated as denoted by reference numeral 210*b*. When longitudinal speeds of the vehicle are speeds denoted by reference numerals 220*a*, 230*a*, and 240*a*, the available travelling spaces are calculated as denoted by reference numerals 220*b*, 230*b*, and 240*b*.

Next, the present invention extracts the available travelling space considering a transverse speed of the travelling vehicle as illustrated in FIG. 2B. When a rotation degree of the vehicle is determined according to a size of a steering angle, the available travelling space is calculated as denoted by reference numerals 261 to 264 according to a travelling movement 250 of the vehicle according to elapse of the time.

FIG. 3 is a reference diagram for describing a method of generating a 2D road map based on outer road information in the system according to the exemplary embodiment of the present invention.

In order to generate a 2D road map, there need to exist a road 310 appropriate for the travelling of the vehicle, and fixed objects 320*a* and 320*b* at both sides of the road 310. When a laser scanner recognizes the fixed objects 320*a* and 320*b* are as moving objects according to the travelling of the vehicle, travelling curved lines 330*a* and 330*b* of the vehicle may be obtained from a continuous curved line between the fixed objects on the same line.

A connection range needs to be determined considering a vehicle speed when the fixed objects on the same line are connected. That is, the fixed objects positioned at an entrance disallowed or prohibited area are excluded from the targets for connection, and the remaining fixed objects are considered as respective points and the respective points are connected considering a rotation radius of the vehicle according to the vehicle speed. When a task for connecting the scattered points by one line is completed, line smoothening is required. When the line smoothening is completed, a travel route outer-peripheral virtual line is generated, and in the present invention, the 2D road map is configured based on the virtual line.

In the meantime, the present invention considers the matters below when generating the travel route outer-peripheral virtual line.

① Is a width of the detected space smaller than a width of the vehicle? When the width of the detected space is smaller than the width of the vehicle, the detected space is connected to the same object.

② Is a width of the detected space greater than a width of the vehicle? When the width of the detected space is larger than the width of the vehicle, is the vehicle allowed to pass through the detected space considering a current vehicle speed? If the vehicle cannot pass through the detected space, the detected space is connected to the same object. If the vehicle can pass through the detected space, an appropriate vehicle speed is calculated and notified.

③ What is a measure of an open space?

Open space (only open)→decrease the vehicle speed (calculate a dynamic speed): in the case of the set travel route Open space (possible close)→change a map →Connect the objects according to the speed of the travelling vehicle, non-considered target: Change the vehicle speed according to the travelling space FIG. 4 is a flowchart illustrating the operation sequence of the system according to the exemplary embodiment of the present invention in detail.

First, an outer travelling road is detected (405). The outer travelling road may be detected as described above with reference to FIG. 3.

Then, a distance to an object is detected by using a laser scanner angle-fixed to the travelling vehicle (S410).

Then, when a longitudinal speed and a transverse speed of the vehicle are obtained (S415), a moving direction of the vehicle is predicted by using the longitudinal/transverse speed of the travelling vehicle and the distance to the object (S420).

Then, information on the space predicted from the outer travelling road is combined with information on the longitudinal/transverse speed of the travelling vehicle (S425) to generate a travel route (S430).

When the travel route is generated through the aforementioned process (S435), it is confirmed whether an object is detected within the travel route (S440).

When the object is not detected within the travel route, the travel route is determined as an available travelling space (S445), position coordinates of the travel route are notified (S450), and the travelling of the vehicle is controlled by adopting the amount of acceleration/deceleration (S455).

In the meantime, when the object is detected within the travel route, the process is performed from operation S430 again.

In the meantime, when operations S405 to S430 are sequentially performed, but the travel route is not generated (S435), it is determined whether the vehicle speed is greater than 1 kilometer per hour (KPH) (S460).

When the vehicle speed is greater than 1 KPH, the speed of the travelling vehicle is decreased (S465).

However, when the vehicle speed is equal to or smaller than 1 KPH, it is determined that it is impossible to generate the travel route in a current space (S470), and this fact is notified to a driver (S475).

In the above, the present invention configured according to the exemplary embodiment has been described with reference to FIGS. 1 to 4. The aforementioned features of the present invention will be summarized below.

First, an available travelling space of a vehicle is extracted by using information on a distance between an object and the vehicle, which is measured by the unmanned travelling vehicle.

Second, an available travelling space is searched by simulating an available travelling space in advance considering a travelling speed of the vehicle from an outer portion of a generated road.

Third, an available travelling space is repeatedly searched by virtually decreasing a speed of the travelling vehicle in a situation where the available travelling space is not extracted.

Fourth, position coordinates of the available travelling space and the vehicle speed are distinguished in the extracted available travelling space.

Fifth, the position coordinates of the vehicle and the speed of the vehicle are transmitted to a control device of the unmanned vehicle.

A preferred embodiment of the present invention will be suggested below based on the exemplary embodiment of the present invention described with reference to FIGS. 1 to 4. FIG. 5 is a block diagram schematically illustrating a travel route generating apparatus according to an exemplary embodiment of the present invention.

According to FIG. 5, a travel route generating apparatus 500 includes a space information obtaining unit 510, a travelling direction estimating unit 520, a travel route generating unit 530, a power supply unit 560, and a main control unit 570.

The power supply unit 560 supplies power to individual components of the travel route generating apparatus 500. The main control unit 570 controls the entire operation of individual components of the travel route generating apparatus 500. Considering the fact that the travel route generating apparatus 500 may be mounted and implemented in an ECU within the vehicle in the form of an algorithm, or controlled by the ECU, the power supply unit 560 and the main control unit 570 may not be included in the present exemplary embodiment.

The space information obtaining unit 510 obtains information on a space, in which a driver's vehicle may travel, by using fixed objects positioned at both sides of the driver's vehicle. The space information obtaining unit 510 may extract fixed objects from an image obtained by photographing a front side of the driver's vehicle, or an image obtained by collecting laser signals emitted to the front side of the driver's vehicle and then reflected and returned. In the above description, the fixed object may include a street tree, a building, a streetlamp, a median strip, and a stopped or parked vehicle.

The travelling direction estimating unit 520 estimates a travelling direction of the driver's vehicle based on travelling information about the driver's vehicle and information on distances to the fixed objects.

The travelling direction estimating unit 520 may use a speed of the driver's vehicle as the travelling information and information on a rotation of the driver's vehicle, an angular speed or a steering angle may be used as the information on the rotation.

The travel route generating unit 530 generates a travel route of the driver's vehicle based on the space information obtained by the space information obtaining unit 510 and the travelling direction of the driver's vehicle estimated by the travelling direction estimating unit 520.

The travel route generating unit 530 may generate the travel route by including a coordinate value of a position in which the driver's vehicle is to travel, and a travelling available speed of the driver's vehicle.

The travel route generating apparatus 500 may further include a travel route selecting unit 540 and a speed control unit 550.

When two or more travel routes are generated by the travel route generating unit 530, the travel route selecting unit 540 selects one travel route based on whether a moving object is positioned in each travel route, and a radius of the rotation of the driver's vehicle. The moving object includes a travelling vehicle and the like.

When the travel route is not generated for a predetermined time, the speed control unit 550 decreases a speed of the driver's vehicle, and sequentially drives the space information obtaining unit 510, the travelling direction estimating unit 520, and the travel route generating unit 530 again.

The aforementioned travel route generating apparatus 500 may be driven when it is impossible to generate the travel route by using the GPS. However, the driving of the travel route generating apparatus 500 is not limited thereto.

In the meantime, when only the fixed objects positioned at one side of the driver's vehicle are extracted, the space information obtaining unit 510 may obtain space information based on the fixed objects extracted at one side of the driver's vehicle, and a width obtained by adding a predetermined value to a width of the driver's vehicle.

The space information obtaining unit 510 uses the width obtained by adding the predetermined value to the width of the vehicle in order to secure a clearance for the movement of the vehicle. For example, when the width of the vehicle is 2.5 m, it is assumed that a width of the road is 3.0 m which is obtained by adding a predetermined value of 0.5 m to 2.5 m, and 3.0 m may be used as the width.

In the meantime, when the fixed objects are not extracted at both sides of the driver's vehicle, the space information obtaining unit 510 may recognize both lines and obtain the space information.

FIG. 6 is a flowchart schematically illustrating a method of generating a travel route according to an exemplary embodiment of the present invention. The method will be described with reference to FIGS. 5 and 6.

First, the space information obtaining unit 510 obtains information on a space, in which a driver's vehicle may travel, by using fixed objects positioned at both sides of the driver's vehicle (S610).

The travelling direction estimating unit 520 estimates a travelling direction of the driver's vehicle based on travelling information about the driver's vehicle and information on distances to the fixed objects (S620). Operation S620 may be performed with operation S610 at the same time, but may be performed before or after operation S610.

When the space information is obtained by the space information obtaining unit 510 and the travelling direction of the driver's vehicle is estimated by the travelling direction estimating unit 520, the travel route generating unit 530 generates a travel route of the driver's vehicle based on the space information and the travelling direction of the driver's vehicle (S630).

The number of travel routes generated by the travel route generating unit 530 is generally 1. However, two or more travel routes may be generated, or the travel route may not be generated.

The main control unit 570 determines whether the number of travel routes generated by the travel route generating unit 530 is plural (S640).

When the plurality of travel routes is generated by the travel route generating unit 530, the travel route selecting unit 540 selects one travel route based on whether a moving object is positioned in each travel route, and a radius of the rotation of the driver's vehicle (S650). Then, the main control unit 570 determines the selected travel route, and controls the travelling of the vehicle based on the travel route (S670).

In the meantime, when the number of travel routes generated by the travel route generating unit 530 is not plural, the main control unit 570 determines whether the travel route is generated (S660).

When the travel route is generated by the travel route generating unit 530, the number of travel route is 1, so that the main control unit 570 controls the traveling of the vehicle based on the travel route (S670).

In the meantime, when the travel route is not generated by the travel route generating unit 530, that is, the travel route is not generated for a predetermined time, the speed control unit 550 decreases the speed of the driver's vehicle (S680), and controls the process to be performed from operation S610 or operation S620 again.

Even though it is described that all components of the exemplary embodiment of the present invention may be combined as one component or operates to be combined, the present invention is not limited to the exemplary embodiment. In other words, one or more of all components may be selectively combined to be operated within a scope of the present invention. All components may be implemented as one independent hardware but a part or all of the components are selectively combined to be implemented as a computer program which includes a program module which performs a part or all of functions combined in one or plural hardware. Such a computer program may be stored in a computer readable medium such as a USB memory, a CD disk, or a flash memory to be read and executed by a computer to implement the exemplary embodiment of the present invention. The recording medium of the computer program may include a magnetic recording medium, an optical recording medium, or a carrier wave medium.

All terms used herein including technical or scientific terms have the same meanings as meanings which are generally understood by those skilled in the art unless they are differently defined in the detailed description. A term ordinarily used like that defined by a dictionary shall be construed that it has a meaning equal to that in the context of a related description, and shall not be construed in an ideal or excessively formal meaning unless it is clearly defined in the present specification.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of generating a travel route of a moving vehicle on a road, the method comprising:
    detecting fixed objects positioned on left and right sides of the vehicle using at least one sensor coupled to the vehicle;
    measuring distances to the fixed objects;
    obtaining space information for a space in which the vehicle is allowed to travel using the distances to the fixed objects, the space having at least two dimensions;
    estimating a travelling direction of the vehicle based on travelling information about the vehicle, a current velocity of the vehicle, and the distances to the fixed objects measured by the sensors; and
    generating a travel route for the vehicle based on the space information and the travelling direction of the vehicle,
    when a travel route is not generated within a predetermined time, decreasing the vehicle's velocity, and repeating the measuring distances, the obtaining space information, the estimating a travelling direction and the generating a travel route, and
    wherein the travelling information includes a longitudinal velocity and a transverse velocity.

2. The method of claim 1, wherein the at least one sensor is chosen from an optical sensor and a laser sensor.

3. The method of claim 1, wherein the longitudinal velocity and the transverse velocity are determined from a steering angle of the vehicle.

4. The method of claim 1, wherein generating the travel route includes determining a coordinate value of a position in which the vehicle is to travel, and a travelling available speed of the driver's vehicle.

5. The method of claim 1, wherein generating a travel route includes generating a plurality of travel routes, the method further comprising:
    selecting one of the at least two travel routes based on whether a moving object is positioned in each of the plurality of travel routes, and a radius of rotation of the vehicle.

6. The method of claim 1, further comprising:
    decreasing a velocity of the vehicle when the travel route is not generated after a predetermined time; and
    generating a second travel route based on the decreased velocity.

7. A vehicle navigation system comprising:
    at least one sensor; and
    an electronic control unit (ECU) coupled to the at least one sensor, the ECU having at least one processor and a computer readable medium with executable instructions stored thereon which, when executed by the processor, perform the following operations:
    detecting fixed objects positioned on left and right sides of the vehicle using at least one sensor coupled to the vehicle;
    measuring distances to the fixed objects;
    obtaining space information for a space in which the vehicle is allowed to travel using the distances to the fixed objects, the space having at least two dimensions;
    estimating a travelling direction of the vehicle based on travelling information about the vehicle, a current velocity of the vehicle, and the distances to the fixed objects measured by the sensors; and
    generating a travel route for the vehicle based on the space information and the travelling direction of the vehicle,
    when a travel route is not generated within a predetermined time, decreasing the vehicle's velocity, and repeating the measuring distances, the obtaining space information, the estimating a travelling direction and the generating a travel route,
    wherein the travelling information includes a longitudinal velocity and a transverse velocity.

8. The vehicle navigation system of claim 7, wherein the at least one sensor is one of a laser sensor and an image sensor.

9. The vehicle navigation system of claim 7, wherein the longitudinal velocity and the transverse velocity are determined from a steering angle of the vehicle.

* * * * *